3,444,467
METER AND ALARM CIRCUIT INCLUDING SWITCHING MEANS FOR MEASURING EITHER OF TWO POTENTIALS AND AMPLIFIER TRIGGERING MEANS FOR COMPARING THE TWO POTENTIALS
Arnie L. Cliffgard, Fountain Valley, Calif., assignor to Beckman Instruments, Inc., a corporation of California
Filed Dec. 8, 1967, Ser. No. 689,046
Int. Cl. G01r *19/14;* G08b *21/00*
U.S. Cl. 324—133                    1 Claim

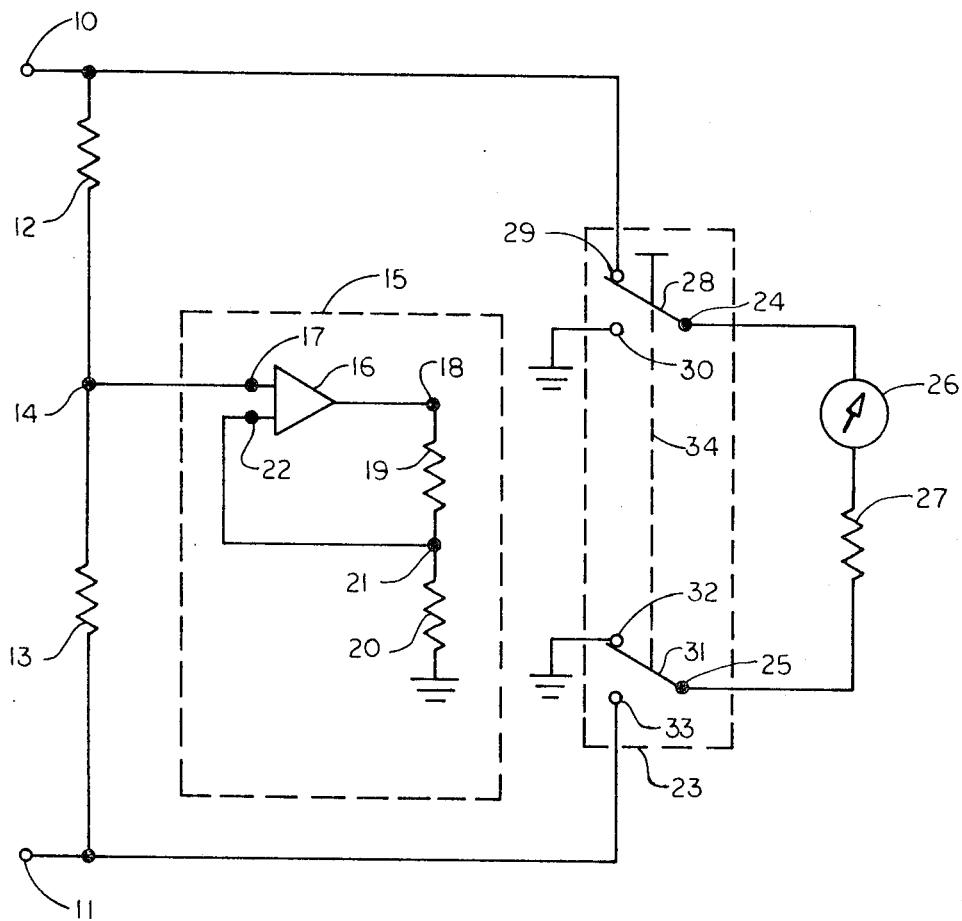

ABSTRACT OF THE DISCLOSURE

An improved alarm circuit for use with measuring instrumentation such as pH, oxygen, etc. employing a meter which can be switched to measure either the input potential or the set point reference potential and a potentiometric amplifier provided with positive feedback and having a dead band to actuate an alarm signal when the input potential exceeds the set point potential a predetermined amount.

Background of the invention

This invention relates to an alarm circuit and more particularly to such a circuit in which a single meter without alarm contacts may selectively read the input or the set point potential.

Prior art alarm circuits yielding indications when a function being measured exceeds an adjustable set point potential have employed meters having alarm contacts. Precision movements are required in order to assure that the set point potential is accurately indicated by the meter. It is desirable to provide, as is done by the invention, a circuit in which an inexpensive meter of any accuracy, and without alarm contacts, may be used to accurately determine the desired set point.

Summary of the invention

Accordingly, it is an object of this invention to provide an alarm circuit which may employ an inexpensive meter without alarm contacts for measuring either the input potential or the set point potential.

This and other objects are achieved by providing a circuit including a meter for measuring an input potential applied to an input terminal and an alarm output to indicate when the input potential exceeds the given level including a reference terminal for connection to an adjustable set point reference potential of a polarity opposite to said input potential with respect to a common point; first and second series connected equal precision resistors having one end connected to the input terminal, the other end connected to the reference terminal and an intermediate terminal between the resistors; a potentiometric amplifier having an input impedance sufficiently high so as not to load down the input potential having one inverting input terminal connected to the intermediate terminal, an output terminal for providing the alarm output connected through third and fourth series connected resistors to a common point, a positive feedback connection from between the third and fourth resistors to its other non-inverting input terminal, the third and fourth resistors being selected so that when the input potential exceeds the set point potential by an amount determined by twice the product of the output voltage of said amplifier times the ratio of the resistance of the fourth resistor to the sum of the resistances of the third and fourth resistors, the amplifier, if in its state not providing an alarm output, will rapidly switch its state to provide an alarm signal on its output terminal, and when the input potential goes less than the set point potential by said amount, if in its state providing an alarm output, will rapidly switch its state to remove the alarm signal on its output terminal; and, switching means for selectively connecting the meter from the input terminal or the reference terminal and in opposite polarity to the common point in order to read the input potential or set point potential respectively.

The novel features which are believed to be characteristic of the invention are set forth with particularity in the appended claim. The invention and further objects and advantages thereof can best be understood by reference to the following description and accompanying drawing.

Brief description of the drawing

The drawing is a schematic diagram of an alarm circuit in accordance with the invention.

Description of the preferred embodiment

Turning now to the drawing, there is shown an input terminal 10 for connection to a source of input potential to be measured such as the output of a pH electrode, an oxygen sensor, etc., and a reference terminal 11 for connection to an adjustable set point reference potential of a polarity opposite to the input potential with respect to a common point. First and second equal series connected precision resistors 12 and 13 are connected from terminal 10 to terminal 11 respectively and are provided with an intermediate terminal 14. A potentiometric amplifier 15 having a high input impedance so as not to load down the measuring circuit includes an amplifier 16 having an inverting input terminal 17 connected to the terminal 14 and an output terminal 18 at which the alarm "out" signal is provided. Third and fourth resistors 19 and 20 are respectively connected in series between the terminal 18 and common. A terminal 21 between said third and fourth resistors 19 and 20 is connected to a second non-inverting input terminal 22 of the amplifier 16, which is connected to function as a Schmitt trigger. Positive feedback is employed in order to provide hysteresis.

A switch 23 is provided having terminals 24 and 25 across which an ammeter 26 in series with a resistance 27 may be connected. Terminal 24 has an associated movable member 28 for contacting fixed contacts 29 and 30 and terminal 25 has an associated movable member 31 for contacting fixed contacts 32 and 33. An actuator 34 is provided to actuate movable members 28 and 32 and when it is in the "up" position, input terminal 10 is connected through contact 29, terminal 24, meter 26, resistor 27, terminal 25 and contact 32 to common. When the actuator 34 is in the "down" position, reference terminal 11 is connected through contact 33, terminal 25, resistor 27, meter 26, terminal 24 and contact 30 to common. In this manner the meter 26 may read either the input potential on terminal 10 or the set point reference potential on terminal 11.

The provision of the meter in the foregoing manner permits the set point to be set by measuring the voltage at the adjustable reference terminal 11 and adjusting to the desired alarm point.

In a practical application of the circuit of the invention, such as in transportation of fresh produce, at the start of the trip the instrument would be calibrated by pushing actuator 32 to the lower position and setting the reference potential to make the meter 26 indicate the desired set point. When the input potential is 5 volts, for instance, this might be equivalent to 5% oxygen. Then the meter 26 should read full scale. The reference potential then would be set to make the meter 26 read the set point, which might be ⅕ scale to control the environment around 1% oxygen. Then if the calibration of the meter were changed due to damage in transit, the load of produce would arrive safely because the set point would remain the same. With an alarm meter this would not be the case.

In a process application where the value of the input potential may not be known but the process has reached a desired level, the meter 26 may be read and the actuator 34 pushed to adjust the set point to the same reading which will maintain the process at the desired level. The accuracy or linearity of the meter 26 will not affect the accuracy of the set point in such an application since it is only the identity of the two readings which is critical. Again during operation if the calibration of the meter 26 changes, the changed reading of the set point on the meter can be checked by depressing actuator 34.

If the input potential to the amplifier 16 on terminal 17 is designated V, the error potential across the terminals 17 and 22, $e$, the output potential on terminal 18, $E_o$, the resistors 19 and 20, $R_2$ and $R_1$, respectively, and if the gain of amplifier 16 is A, then, $$V = e + E_o \frac{R_1}{R_1 + R_2} \quad (1)$$

$E_o$ will be either a maximum or a minimum value depending on the state of amplifier 16. If the amplification A is large then $e$ is nearly 0 and the condition for the change in state of the amplifier 16 is $$V = E_o \frac{R_1}{R_1 + R_2} \quad (2)$$

Accordingly, if $R_1$ is small the dead band of the amplifier 16 is small. Typical values used in implementing the invention are 10,000 ohm precision resistors for resistors 12 and 13, 220,000 ohms for resistor 19 and 1,000 ohms for resistor 20.

The system is not affected by vibrations as is a mechanical meter relay system.

Since the principles of the invention have now been made clear, modifications which are particularly adapted for specific situations without departing from those principles will be apparent to those skilled in the art. The appended claim is intended to cover such modifications as well as the subject matter described and to only be limited by the true spirit of the invention.

What is claimed is:

1. In a circuit including a meter for measuring an input potential applied to an input terminal and an alarm output to indicate when the input potential exceeds a given level, the improvement comprising:

a reference terminal for connection to an adjustable set point reference potential of a polarity opposite to said input potential with respect to a common point;

first and second series connected equal precision resistors having one end connected to said input terminal, the other end connected to said reference terminal and an intermediate terminal between said resistors;

a potentiometric amplifier having an input impedance sufficiently high so as not to load said input potential having one inverting input terminal connected to said intermediate terminal, an output terminal for providing said alarm output connected through third and fourth series connected resistors to said common point, a positive feedback connection from between said third and fourth resistors to its other non-inverting input terminal, said third and fourth resistors being selected so that when said input potential exceeds said set point potential by an amount determined by twice the product of the output voltage of said amplifier times the ratio of the resistance of said fourth resistor to the sum of the resistances of said third and fourth resistors, said amplifier, if in its state not providing an alarm output, will rapidly switch its state to provide an alarm signal on said output terminal, and when said input potential goes less than said set point potential by said amount, if in its state providing an alarm output, will rapidly switch its state to remove the alarm signal on said output terminal; and, switching means for selectively connecting said meter from said input terminal or said reference terminal and in opposite polarity to said common point in order to read said input potential or said set point potential respectively.

References Cited

UNITED STATES PATENTS

| | | | |
|---|---|---|---|
| 2,603,746 | 7/1952 | Burkhart et al. | 328—156 XR |
| 2,779,872 | 1/1957 | Patterson | 328—156 XR |
| 2,802,181 | 8/1957 | Gorski | 324—140 XR |
| 2,994,825 | 8/1961 | Anderson | 328—148 XR |
| 3,157,870 | 11/1964 | Marino et al. | 307—235 XR |
| 3,289,094 | 11/1966 | Young | 307—235 XR |
| 3,311,753 | 3/1967 | Nelson | 307—235 XR |
| 3,317,753 | 5/1967 | Mayhew | 307—235 XR |
| 3,350,703 | 10/1967 | Johnson | 340—248 XR |

RUDOLPH V. ROLINEC, *Primary Examiner.*

G. R. STRECKER, *Assistant Examiner.*

U.S. Cl. X.R.

324—30, 140; 328—148; 340—248